United States Patent
Riggs

(10) Patent No.: US 7,127,576 B1
(45) Date of Patent: Oct. 24, 2006

(54) METHOD AND SYSTEM FOR DATA DUPLICATION

(75) Inventor: Craig R. Riggs, Plano, TX (US)

(73) Assignee: Raytheon Company, Waltham, MA (US)

(*) Notice: Subject to any disclaimer, the term of this patent is extended or adjusted under 35 U.S.C. 154(b) by 397 days.

(21) Appl. No.: 10/444,155

(22) Filed: May 21, 2003

(51) Int. Cl.
G06F 12/00 (2006.01)
G11B 15/18 (2006.01)

(52) U.S. Cl. .................. 711/162; 711/161; 360/69; 360/70; 360/71

(58) Field of Classification Search ............. 711/112, 711/114, 154, 155; 360/69–71, 73.01, 83
See application file for complete search history.

(56) References Cited

U.S. PATENT DOCUMENTS

| 4,503,470 | A | * | 3/1985 | Mita et al. ............. 386/47 |
| 4,551,775 | A | * | 11/1985 | Koizumi et al. .......... 360/74.1 |
| 5,055,948 | A | * | 10/1991 | Kiyonaga ............... 360/69 |
| 5,390,871 | A | * | 2/1995 | Gelardi et al. .......... 242/347.2 |
| 5,602,686 | A | * | 2/1997 | Shih .................... 360/48 |
| 6,459,540 | B1 | * | 10/2002 | Beavers et al. ......... 360/73.08 |

OTHER PUBLICATIONS

SONY Digital Instrumentation Recorder, DIR-1000H; Users Manual, 1st Edition, Serial No. 10001 and Higher; Oct. 13, 1997.*
SONY Digital Instrumentation Recorder, DIR-1000H; Users Manual, 1st Edition, Serial No. 10001 and Higher, Oct. 31, 1997.

* cited by examiner

Primary Examiner—T Nguyen
(74) Attorney, Agent, or Firm—Baker Botts L.L.P.

(57) ABSTRACT

According to one embodiment of the invention, a system for duplicating data is provided. The system includes a first recorder having an operating clock speed. An output port of the first recorder is permanently electrically coupled to an input port of a second recorder. The first recorder and the second recorder are coupled to a time code regenerator. The time code regenerator is operable to maintain a same operating clock speed as an operating clock speed of the first recorder and to provide to the second recorder a replacement time code for any time code that may not be communicated from the first recorder to the second recorder.

12 Claims, 2 Drawing Sheets

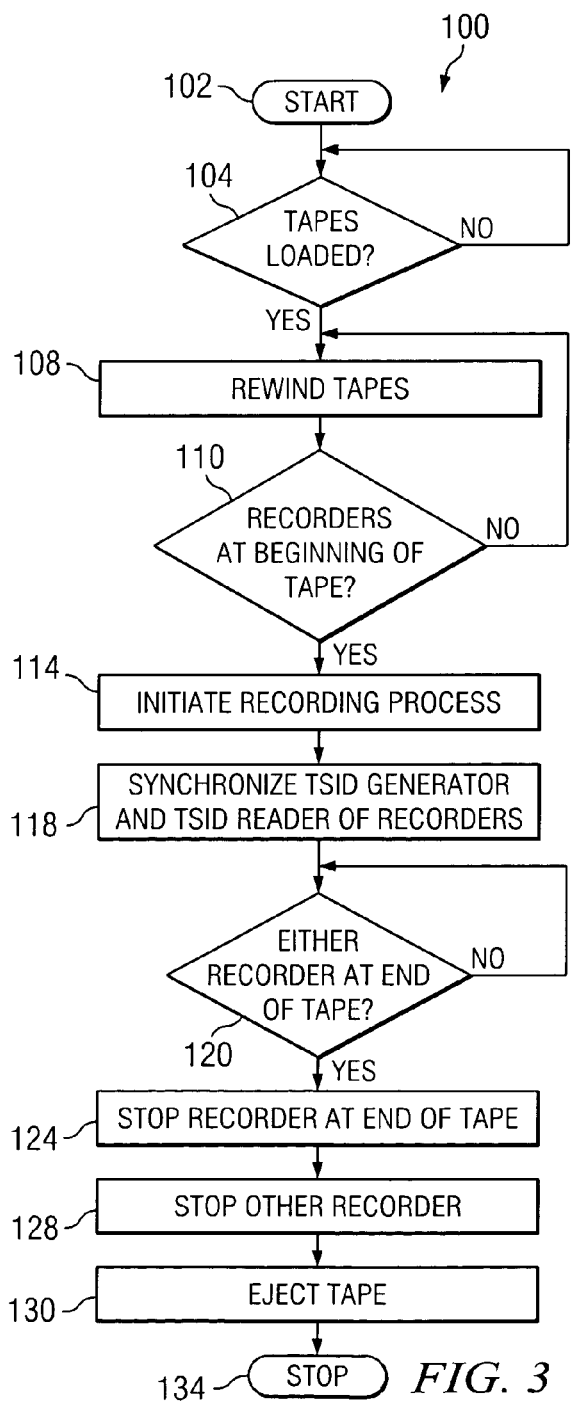
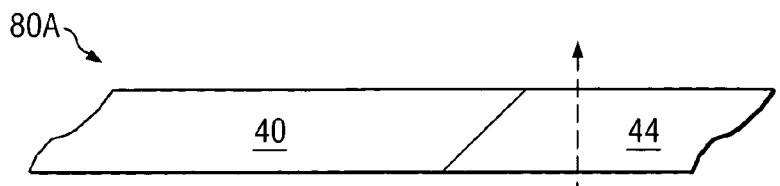
FIG. 2B
FIG. 3

METHOD AND SYSTEM FOR DATA DUPLICATION

TECHNICAL FIELD OF THE INVENTION

This invention relates generally to data processing and more particularly to a method and system for data duplication.

BACKGROUND OF THE INVENTION

Indexing data allows a user to label and locate a specific portion of data. One way to index data is to associate a unique time stamp with a particular portion of data. Where a large volume of data is involved, time stamps may be grouped into time codes, analogous to the way street addresses are grouped into zip codes.

As the level of indexing precision increases, the time increment between each time stamp, as well as the time increment between each time code, may decrease. For example, where a high level of indexing precision is required, time stamps may be in increments of one microsecond and time codes may be in increments of one millisecond. Such a level of indexing precision presents a challenge to data processing, such as the recordation of data. To overcome these challenges, specialized and expensive equipment may be required.

A recording system costing close to a million dollars currently exists that is primarily designed for recording large volumes of data and high precision indexing of data. This system uses high end recorders, such as SONY DIR-1000H available from Sony Corporation, to perform recording functions. Aside from its primary functions, the existing recording system may also be configured to perform an ancillary function of data duplication by manipulating the physical connections between the components of the recording system.

For example, the existing recording system may be manually reconfigured so that one recorder within the recording system reads a source tape and sends the data and time codes to another recorder within the recording system for duplication. The recording system is operable to address any duplication errors due to frequency drift between the two recorders by maintaining the clock speed of the recorder having the source tape. The recording system is also operable to replace any time codes that may be lost between the two recorders with replacement time codes using the appropriate time increment of the time codes. The system uses a multiplexer to use either of the recorders as a source recorder depending on where the source tape is inserted. The system also uses a regenerator to amplify and filter out noise from the time codes received from the recorder having the source tape. The system is also operable to stop the duplication process when the source tape reaches a certain time stamp or time code that is associated with the end of the data without regard to whether either of the tapes have reached their respective physical ends.

To perform data duplication using this existing recording system, the system must be manually reconfigured by manipulating cables at a patch panel of the system so that data can flow from one recorder to another recorder. Further, performing the duplication process using this system fully occupies the operational time of the system, which is undesirable in view of the high cost that is incurred for its primary function of data recording and precision indexing.

SUMMARY OF THE INVENTION

According to one embodiment of the invention, a system for duplicating data is provided. The system includes a first recorder having a data output port and an operating clock speed. The first recorder is operable to receive a source tape storing data and a plurality of time codes indexing the data. The first recorder is also operable to transmit data and the time codes. The data is transmitted through the data output port, and the time codes are chronologically separated from one another by a time increment. The system also includes a time code regenerator coupled to the first recorder. The time code regenerator is operable to maintain a same operating clock speed as the operating clock speed of the first recorder, receive the time codes from the first recorder, generate a replacement time code using the time increment to replace any time code that is not received from the first recorder, and transmit the received time codes and any generated replacement time code. The system also includes a second recorder having a data input port. The second recorder is coupled to the time code regenerator and permanently electrically coupled to the data output port of the first recorder through the data input port. The second recorder is operable to receive a target tape, receive data through the data input port, receive the time codes and any replacement time code from the time code regenerator, and record data, the time codes, and the any replacement time code on the target storage unit.

Some embodiments of the invention provide numerous technical advantages. Other embodiments may realize some, none, or all of these advantages. For example, according to one embodiment, a relatively inexpensive data duplication system that is operable to copy data having high precision indexing is provided. In another embodiment, the need to manually reconfigure a recording system to copy data is eliminated. In another embodiment, duplication error rate is reduced by halting the duplication process when any of the recorders reaches a physical end of the tape.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 2B is a schematic diagram illustrating one embodiment of an end portion of a tape shown in FIG. 2A; and FIG. 3 is a flowchart illustrating one embodiment of a method for controlling the data duplication system shown in FIG. 2A.

DETAILED DESCRIPTION OF EXAMPLE EMBODIMENTS OF THE INVENTION

Figure 1:
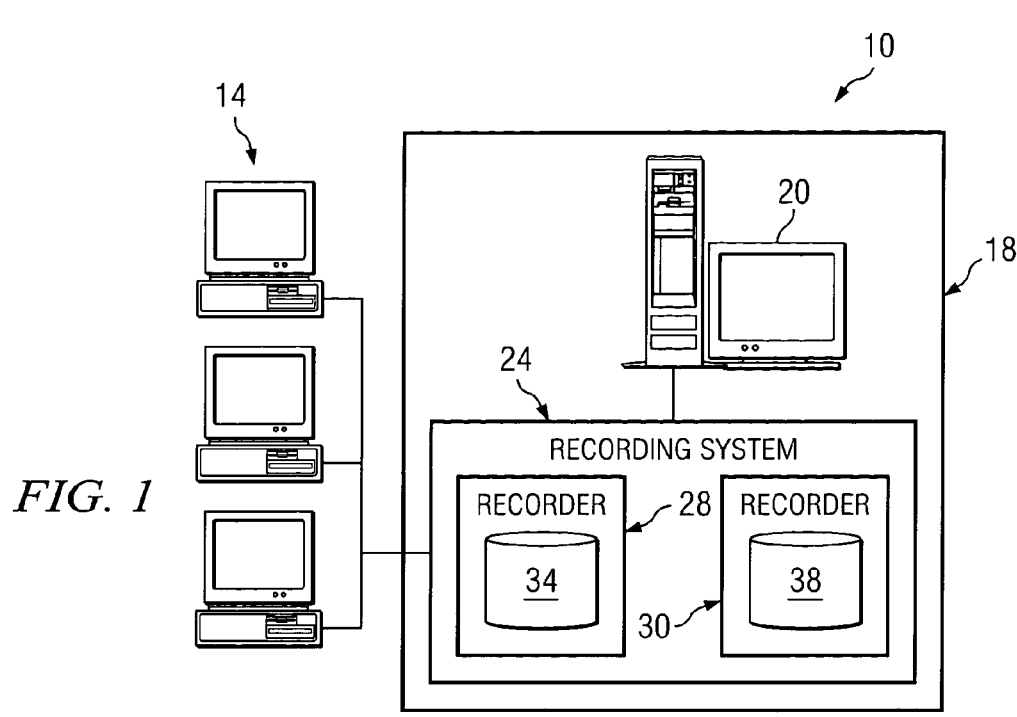
FIG. 1 is a schematic diagram illustrating one embodiment of a data system that may benefit from the teachings of the present invention.

Embodiments of the invention are best understood by referring to FIGS. 1 through 3 of the drawings, like numerals being used for like and corresponding parts of the various drawings.

FIG. 1 is a schematic diagram illustrating one embodiment of a data system 10 that may benefit from the teachings of the present invention. Data system 10 comprises a plurality of computers 14 that are coupled to a data processing system 18. Each computer 14 is operable to generate data associated with different applications. For example, computers 14 may generate audio/visual data, engineering data, financial data, or any other types of data that may be generated from any computer use. Computers 14 are operable to send their respective data to data processing system 18 for storage and processing.

Data processing system 18 comprises a computer 20 coupled to a recording system 24. Recording system 24 comprises a plurality of recorders 28 and 30 each operable to receive data storage units 34 or 38. Computer 20 is operable to manage and control the indexing of incoming data and storage of data in storage units 34 and 38 using recording system 24. For example, data received from computers 14 may be indexed and stored in storage unit 34 using recorder 28. When the maximum storage capacity of storage unit 34 is reached, computer 20 may direct incoming data to recorder 30 so that recorder 30 may pick up the recording operation where recorder 28 left off. When the maximum storage capacity of storage unit 38 is reached, computer 20 may redirect incoming data back to recorder 30 so that recorder 28 may pick up the recording operation where recorder 30 left off. This process may repeat until the data is completely recorded and indexed. A tape is often used as a data storage medium for storing a high volume of data. Thus, a tape is used as an example of storage unit 34 or 38, and storage units 34 and 38 may be referred to as tapes 34 and 38, respectively.

System 18 is operable to index data with indexing precision of at least a millisecond tolerance. While the primary functions of data processing system 18 are recording and precision indexing of data, data processing system 18 may also be reconfigured so that system 18 is operable to duplicate data from one storage unit to another. For example, data in tape 34 may be copied to tape 38 by electrically and physically reconfiguring data paths so that recorder 28 reads and transmits the data stored in tape 34 to recorder 30. This allows data and the indexing information to be duplicated onto tape 38. When performing data duplication, data processing system 18 cannot be used to perform other data processing functions. Data duplication includes duplication of any indexing data, such as a time code.

A data tape, such as tapes 34 and 38, has data tracks and an annotation analog track. The data tracks include data and time stamp associated with each frame of data. The annotation analog track includes time codes. Each time code corresponds to a particular group of time stamps. Thus, a time code is used to find an approximate location of a particular portion of data. Then the time stamp is used to specifically locate the particular portion of data. The time code is conventionally referred to as IRIG-B.

Conventionally, tapes storing data indexed in millisecond time increments cannot be accurately duplicated using a conventional tape duplication system. For example, the difference between the tape speed used to originally record data and the tape speed used to make a copy of the recorded data may cause gaps in data transmission during the duplication process, which leads to a frequency drift between recorders. Because time codes included in the annotation analog track of a source tape is in analog form, the time codes may no longer indicate the correct location of data when it is copied to a target tape.

According to one embodiment of the invention, a method and system for data duplication are provided. In one embodiment, data duplication of tapes having high precision data indexing may be performed at a reduced cost. In another embodiment, the need to manually reconfigure a recording system to copy data is eliminated. Additional details of example embodiments of the invention are described below in greater detail in conjunction with FIGS. 2A–3.

Figure 2A:
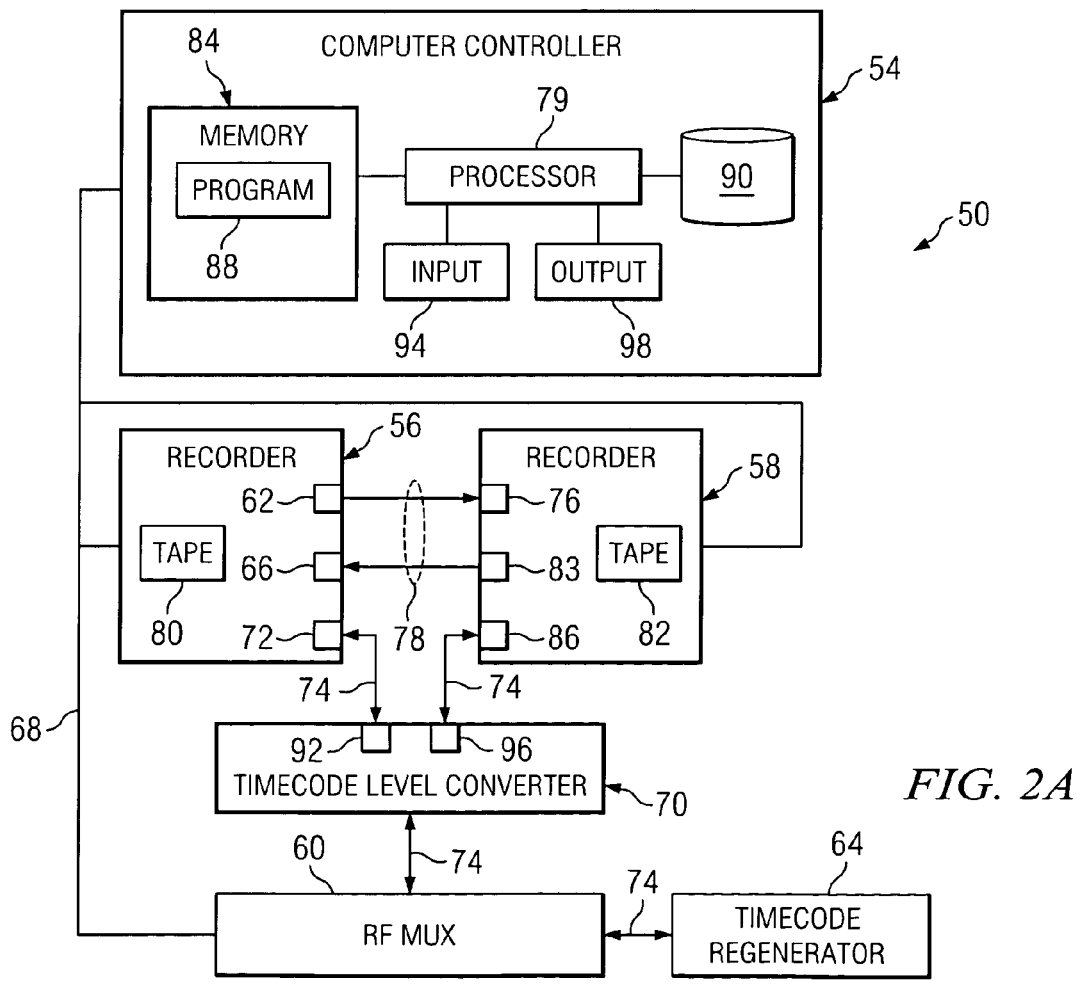
FIG. 2A is a block diagram illustrating one embodiment of a data duplication system according to the teachings of the invention.

FIG. 2A is a block diagram illustrating one embodiment of a data processing system 50. System 50 comprises a computer controller 54, recorders 56 and 58, a time code level converter 70, a radio frequency multiplexer ("RF MUX") 60, and a time code regenerator 64. Controller 54 is coupled to recorder 56, recorder 58, and RF MUX 60 through a bus 68. In one embodiment, a general purpose interface bus ("GPIB") may be used as bus 68; however, any suitable bus may be used as bus 68. Recorders 56 and 58 are coupled to each other through one or more data lines 78. Time code regenerator 64 is coupled to recorders 56 and 58. In one embodiment, as shown in FIG. 2A, time code regenerator 64 is coupled to recorders 56 and 58 through time code level converter 70, RF MUX 60, and lines 74. In one embodiment, the physical electrical coupling between recorders 56 and 58 is permanent. In one embodiment where time code level converter 70 is used, the physical electrical couplings between recorders 56 and 58, time code level converter 70, and time code regenerator 64 are permanent. In one embodiment where RF MUX 60 is used, the physical electrical couplings between recorders 56 and 58, RF MUX 60, and time code regenerator 64 are permanent. In one embodiment where both time code level converter 70 and RF MUX 60 are used, the physical couplings between recorders 56 and 58, time code level converter 70, RF MUX 60, and time code regenerator 64 are permanent. Although FIG. 2A shows recorders 56 and 58 coupled to time code regenerator 64 through time code level converter 70 and RF MUX 60, in one embodiment, time code regenerator 64 may be directly coupled to recorders 56 and 58, and time code level converter 70 and RF MUX 60 may be omitted.

A "permanent" physical electrical coupling or "permanently electrically coupled" refers to a physical conductive coupling between two or more components/ports of components that is operable to carry electrical signals and not physically removable. For example, "permanently electrically coupled" components are components that are soldered, glued, taped together, or fastened together by a permanent fastener, such as a screw/nut combination. Permanently electrically coupled components are not necessarily coupled directly. For example, where time code level converter 70 is permanently coupled to time code regenerator 64, recorder 56, and recorder 58, time code regenerator 64 is considered to be "permanently coupled" to recorders 56 and 58. Also, "permanent" electrical coupling or "permanently electrically coupled" components does not mean that the "virtual" electrical coupling that may result from the conductive physical coupling is permanent. For example, the electrical connection through a "permanent" electrical coupling may be discontinued or switched to another path even though the physical electrical connection still exists.

In one embodiment, a permanent electrical coupling between recorders 56, 58, and/or time code regenerator 64 is advantageous because such a coupling allows system 50 to be dedicated to tape duplication, which eliminates the need to physically and electrically manipulate data paths of recorders to duplicate data. However, some embodiments of the invention may not necessarily benefit from this advantage.

Referring back to FIG. 2A, recorder 56 comprises a data output port 62, a data input port 66, and a time code port 72. Recorder 58 comprises a data input port 76, a data output port 83, and a time code port 86. Time code level converter 70 comprises an input port 92 and an output port 96. In one embodiment, data output port 62 of recorder 56 is permanently electrically coupled to data input port 76 of recorder 58 through a data line 78. In one embodiment, data input port 66 is permanently electrically coupled to data output port 83. Time code port 72 of recorder 56 is coupled to an input port of time code regenerator 64. Time code port 86 is coupled to an output port of time code regenerator 64. In one embodiment, the coupling between input port of time code regenerator 64 and port 72 is permanent. In one embodiment, the coupling between output port of time code regenerator 64 and port 86 is permanent. In one embodiment, respective ports 72 and 86 of recorders 56 and 58 are coupled to the ports of time code regenerator 64 through time code level converter 70 and/or RF MUX 60.

As shown in FIG. 2A, in such an embodiment, time code port 72 of recorder 56 is coupled to input port 92 of time code level converter 70 through time code line 74. In one embodiment, the physical conductive connection between time code port 72 and input port 92 is permanent. Time code port 86 is coupled to output port 96 of time code level converter 70 through time code line 74. In one embodiment, the physical connection between time code port 86 and output port 96 is permanent. An example of recorders 56 and 58 is SONY DIR-1000M, which is less expensive than conventionally used recorders, such as SONY DIR-1000H.

The physical coupling between recorders 56, 58 and time code level converter 70 has been described above for a case where recorder 56 is a source recorder that transmits the data to be duplicated to recorder 58, which functions as a target recorder. However, in an embodiment where recorder 58 is a source recorder, certain physical couplings described above may be reversed. For example, data output port 83 of recorder 58 may be permanently coupled to data input port 66 of recorder 56 through data line 78. Time code port 86 may be coupled, permanently in some embodiments, to input port 92 of time code level converter 70 through time code line 74. Time code port 72 may be coupled, permanently in some embodiments, to output port 96 of time code level converter 70. In one embodiment where recorders 56 and 58 may function as a source recorder or a target recorder, depending on the setting, input ports 66 and 76 may be respectively coupled, permanently in some embodiments, to output ports 62 and 83. Such a configuration allows an electronic selection of recorder 56 or 58 as a source recorder.

Recorders 56 and 58 are each operable to receive data storage units, such as tapes 80 and 82. A tape is often used as a data storage medium for storing a high volume of data. Recorders 56 and 58 are each operable to read data stored in their respective tapes 80 and 82, transmit the data, and record any received data. As an example, tape 80 is referred to as a source tape 80 to indicate that source tape 80 stores data to be duplicated. Tape 82 is referred to as a target tape 82 to indicate that data stored in source tape 80 is copied to target tape 82. Thus, recorder 56 is referred to as a source recorder 56 because recorder 56 has source tape 80. Analogously, recorder 58 is referred to as a target recorder 58 because recorder 58 has target tape 82. However, any recorder 56 or 58 may be a source recorder or a target recorder, depending on the location of source tape 80.

Source recorder 56 is operable to transmit data that is on the data track of source tape 80 to target recorder 58. Target recorder 58 is operable to receive the data over data line 78 and record the data to data track of tape 82. Source recorder 56 is also operable to send time code information recorded on the annotation analog track of source tape 80 to time code regenerator 64—through time code level converter 70, in one embodiment. Target recorder 58 is operable to receive the time code information from time code regenerator 64—through time code level converter 70, in one embodiment—and record the time code onto the annotation analog track of target tape 82. In one embodiment, recorders 56 and 58 are also operable to detect the end of a tape by detecting that a tape has reached its end. Additional details concerning tape end detection are provided below in conjunction with FIG. 2B. In one embodiment, once one recorder 56 or 58 reaches the end of a tape, recorder 56 or 58 is operable to direct the other recorder 56 or 58 to stop. For example, if target recorder 58 detects that a physical end of target tape 82 has been reached, source recorder 56 may inform computer controller 54 that an end has been reached. In response, computer controller 54 may deactivate source recorder 56 via bus 68. This is advantageous in some embodiments because the integrity of the data on target tape 82 is maintained. In one embodiment, the detection of the physical end of a tape is made without regard to whether the end of data has been reached. This is not necessary in the existing recording/indexing device described in the background section because that device deactivates the recording process by detecting the end of data, which may be reached before the physical end of the tape.

Time code level converter 70 is operable to receive time code information from source recorder 56 through input port 92, amplify the received time code information, and send the amplified time code information to time code regenerator 64. In one embodiment shown in FIG. 2A, the amplified time code information is sent through RF MUX 60. Time code level converter 70 is also operable to receive time code information processed by time code regenerator 64 and send the information to recorder 58 through output port 96. One example of a time code level converter 70 is model 560, available from True Time, Inc.

RF MUX 60 is operable to designate recorders 56 and 58 as either a source recorder or a target recorder. In one embodiment, RF MUX 60 is operable to automatically make this determination based on whether a tape inserted into a recorder is write-protected. For example, computer controller 54 may receive information from recorder 56 that tape 80 is write-protected, which indicates that tape 80 is a source tape. Computer controller 54 may send this information to RF MUX 60, which designates recorder 56 as a source recorder by selecting data output port 62 of source recorder 56 to data input port 76 of target recorder 58. Analogous process may be performed by RF MUX 60 to designate recorder 58 as a source recorder where tape 82 is determined as a write-protected tape.

Time code regenerator 64 is operable to maintain a particular frequency of a source recorder, such as source recorder 56. For example, if source recorder 56 is capable of operating at 1.5 MHz, then time code regenerator 64 is also operable to maintain the frequency of 1.5 MHz. Thus, if the synchronization between source recorder 56 and target recorder 58 starts to drift due to any recording errors, such as a blank data spot in the data transmission, time code regenerator 64 is operable to mitigate the drifting effect by maintaining the original operating frequency of 1.5 MHz for target recorder 58.

Time code regenerator 64 is also operable to filter out noise from the time codes received through its input port and generate a time code to replace any missing time codes by counting in a particular increment used by the indexing data read by source recorder 56. Time code regenerator 64 is also operable to transmit the time codes and any replacement time codes to time code input port 86 of target recorder 58 through its output port. Thus, if the time codes transmitted by source recorder 56 are in millisecond increments, then time code regenerator 64 is operable to provide replacement time codes in millisecond increments. For example, time code regenerator 64 may receive an incomplete time code set of "10, 11, _, _, 14" millisecond time codes, with "12" and "13" millisecond time codes missing. Because time code regenerator 64 is operable to count in millisecond increments and maintain the same operating frequency as source recorder 56, time code regenerator 64 is operable to provide replacement time codes "12" and "13" in correct chronological order using the last received time code of "11" and transmit a complete time code set of "10, 11, 12, 13, 14" milliseconds to recorder 58. In one embodiment, the processed time codes may be transmitted to recorder 58 through RF MUX 60 and time code level converter 70. One example of a time code regenerator is model 9700AT, available from True Time, Inc.

Computer controller 54 comprises a processor 79, a memory unit 84 storing a program 88, an input unit 94, and an output unit 98. Processor 79 is coupled to memory unit 84, data storage unit 90, input unit 94, and output unit 98. Processor 79 is operable to execute the logic of program 88 and access data storage unit 90 to retrieve or store data related to program 88. Examples of processor 79 are PENTIUM processors available from Intel Corporation.

Program 88 is a computer program that controls computer controller 54 for the tape duplication. In one embodiment, program 88 is operable to run the diagnostic test for components of system 50, initiate the duplication process, synchronize the duplication process, and end the duplication process. Program 88 may reside in any storage unit, such as memory 84 or data storage unit 90. Program 88 may be written in any suitable computer language, including C or C++.

Memory 84 and data storage unit 90 may comprise files, stacks, databases, or any other suitable forms of data. Memory 84 and data storage unit 90 may be random access memory, read-only memory, CD ROM, removable memory devices, or any other suitable devices that allow storage and/or retrieval of data. Memory 84 and storage unit 90 may be interchangeable and may perform the same functions. Input unit 94 may be any device operable to provide input from a user to controller 54. Output unit 98 may be any device operable to communicate information generated by controller 54 to a user. Examples of input unit 94 include a keyboard, a mouse, and a stylus. Examples of output device 98 include a monitor, printer, and a speaker. Additional details concerning the operation of program 88 are provided below in conjunction with FIG. 3.

FIG. 2B is a schematic diagram illustrating one embodiment of an end portion 80A of tape 80 shown in FIG. 2A. End portion 80A comprises a recording portion 40 and a clear end portion 44. Recording portion 40 comprises data and indexing information. Clear end portion 44 is conventionally positioned where recording portion 40 ends. In one embodiment, recorder 56 or 58 may each comprise a light sensor 52 operable detect clear end portion 44, which indicates to recorder 56 or 58 that a physical end of tape 80 has been reached. In response to the determination, light sensor 52 of recorder 56 or 58 is operable to initiate a communication with computer controller 54 to deactivate the other recorder 56 or 58.

FIG. 3 is a flowchart illustrating a method of controlling recording system 50 shown at FIG. 2A. Method 100 may be implemented using program 88 shown in FIG. 2; however, any other suitable method of implementation may also be used. Method 100 starts at step 102. At decision step 104, program 88 determines whether tapes are loaded into recorders. If no, then "no" branches follow back to step 104. If yes, then "yes" branches follow to step 108 where tapes are rewound. At decision step 110, program 88 determines whether the tapes and recorders are at the beginning of the tape. If no, then the "no" branch is followed to step 108 where tapes are rewound. If yes, then "yes" branch is followed to step 114 where recording process is initiated. At step 118, track set I.D. ("TSID") of the target recorder and TSID reader of the source recorder are synchronized. TSID refers to an identification value recorded on a tape to identify each block of data recorded. The TSID is recorded before the start of data tracks as part of the control record. Any changes in the TSID are programmed into the TSID generator of the target recorder.

At decision step 120, program 88 determines if either recorder is at the end of tape. If no, then "no" branch is followed back to decision step 120. If yes, then "yes" branch is followed to step 124 where the recorder that is at the end of tape is stopped. In response, at step 128, the other recorder is stopped. In one embodiment, as described above in conjunction with FIG. 2B, a recorder may be operable to determine that the tape is at an end using a light sensor that can detect a clear portion of the tape, which is conventionally positioned at the end of the tape. However, any other suitable method of determining that the tape is at its end may be used for this determination. At step 130, the tapes are ejected from recorders. Method 100 stops at step 134.

Although some embodiments of the present invention have been described in detail, it should be understood that various changes, substitutions, and alterations can be made hereto without departing from the spirit and scope of the invention as defined by the appended claims.

What is claimed is:

1. A system for duplicating data, comprising:
   a first recorder having a data output port, an index data output port, and an operating clock speed;
   a time code regenerator having an input port and an output port, the time code regenerator permanently electrically coupled to the index data output port of the first recorder through the input port;
   a second recorder having a data input port and an index data input port, the second recorder permanently electrically coupled to the data output port of the first recorder through the data input port and permanently electrically coupled to the output port of the time code regenerator through the index data input port;
   wherein the first recorder is operable to receive a source tape storing data and a plurality of time codes indexing the data, transmit data and the time codes through the data output port and the index data output port, respectively, the time codes chronologically separated from one another by a time increment;
   wherein the time code regenerator is operable to maintain a same operating clock speed as the operating clock speed of the first recorder, receive the time codes from the first recorder through the input port, generate a replacement time code using the time increment to replace any time code that is not received from the first recorder, and transmit the received time codes and any generated replacement time code through the output port to the second recorder; and
   wherein the second recorder is operable to receive a target tape, receive data through the data input port, receive the time codes and any replacement time code through the index data input port, and record received data, the time codes, and the any replacement time code on the target tape.

2. The system of claim 1, and further comprising:
a computer system having a processor, the system coupled to the first recorder and the second recorder;
a computer readable medium coupled to the computer system, the computer readable medium comprising a program operable, when executed on the processor, to:
activate the first and the second recorders;
determine that the source tape and the target tapes are received by the first recorder and the second recorder, respectively;
determine that the source tape has physically reached an end; and
in response, deactivate the second recorder.

3. The system of claim 1, wherein and further comprising:
a computer system having a processor, the system coupled to the first recorder and the second recorder;
a computer readable medium coupled to the computer system, the computer readable medium comprising a program operable, when executed on the processor, to:
activate the first and the second recorders;
determine that the source tape and the target tapes are received by the first recorder and the second recorder, respectively;
determine that the target tape has physically reached an end; and
in response, deactivate the first recorder.

4. The system of claim 1, wherein the source tape has an approximately clear end portion and the first recorder comprises a light sensor, and wherein the first recorder is operable to determine that the source tape has reached an end by detecting the approximately clear end portion using the light sensor.

5. A system for duplicating data, comprising:
a first recorder having a data output port and an operating clock speed, the first recorder operable to receive a source tape storing data and a plurality of time codes indexing the data and to transmit data and the time codes, wherein data is transmitted through the data output port and the time codes are chronologically separated from one another by a time increment;
a time code regenerator coupled to the first recorder and operable to maintain a same operating clock speed as the operating clock speed of the first recorder, receive the time codes from the first recorder, generate a replacement time code using the time increment to replace any time code that is not received from the first recorder, and transmit the received time codes and any generated replacement time code; and
a second recorder having a data input port, the second recorder coupled to the time code regenerator and permanently electrically coupled to the data output port of the first recorder through the data input port, the second recorder operable to receive a target tape, receive data through the data input port, receive the time codes and any replacement time code from the time code regenerator, and record data, the time codes, and the any replacement time code on the target storage unit.

6. The system of claim 5, and further comprising:
a computer system having a processor, the system coupled to the first recorder and the second recorder;
a computer readable medium coupled to the computer system, the computer readable medium comprising a program operable, when executed on the processor, to:
activate the first and the second recorders;
determine that the source tape and the target tapes are received by the first recorder and the second recorder, respectively;
determine that the source tape has physically reached an end; and
in response, deactivate the second recorder.

7. The system of claim 5, further comprising:
a computer system having a processor, the system coupled to the first recorder and the second recorder;
a computer readable medium coupled to the computer system, the computer readable medium comprising a program operable, when executed on the processor, to:
activate the first and the second recorders;
determine that the source tape and the target tapes are received by the first recorder and the second recorder, respectively;
determine that the target tape has physically reached an end; and
in response, deactivate the first recorder.

8. The system of claim 5, wherein the source tape has an approximately clear end portion and the first recorder comprises a light sensor, and wherein the first recorder is operable to determine that the source tape has reached an end by detecting the approximately clear end portion using the light sensor.

9. The system of claim 5, wherein the first recorder and the second recorder are each operable to determine that an approximate physical end of a tape has been reached without using any indexing data stored on the tape.

10. The system of claim 5, wherein the data output port of the first recorder and the data input port of the second recorder are permanently electrically coupled to each other over a line having two ends that are respectively soldered onto the data output port and the data input port.

11. The system of claim 5, and further comprising:
a time code level converter coupled to the first recorder, the second recorder, and the time code regenerator, wherein the time code level converter is operable to receive the time codes from the first recorder, amplify the received time codes, send the amplified time codes to the time code regenerator, receive the time codes and any replacement time code from the time code regenerator, and send the time codes and the any replacement time code to the second recorder.

12. The system of claim 5, and further comprising a multiplexer coupled to the time code level converter, the multiplexer operable to designate either the first recorder or the second recorder as a source recorder.

* * * * *